US007945235B2

(12) United States Patent
Mahn

(10) Patent No.: US 7,945,235 B2
(45) Date of Patent: *May 17, 2011

(54) NETWORK-BASED SUBSCRIBER CALLING RESTRICTIONS

(75) Inventor: Roger Charles Mahn, Roswell, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/724,640

(22) Filed: Mar. 16, 2010

(65) Prior Publication Data

US 2010/0173606 A1    Jul. 8, 2010

Related U.S. Application Data

(63) Continuation of application No. 11/489,410, filed on Jul. 19, 2006, now Pat. No. 7,711,344.

(51) Int. Cl.
*H04M 11/00* (2006.01)

(52) U.S. Cl. ........ 455/403; 455/445; 455/434; 455/423; 455/466; 370/328

(58) Field of Classification Search .................. 455/403, 455/412.1–412.2, 413, 414.1, 423, 434, 445, 455/466; 370/328, 338, 352, 395.52
See application file for complete search history.

(56) References Cited

U.S. PATENT DOCUMENTS

| 7,711,344 B1* | 5/2010 | Mahn ........................ 455/304 |
| 2005/0282559 A1* | 12/2005 | Erskine et al. ............. 455/456.4 |

* cited by examiner

*Primary Examiner* — Kamran Afshar
(74) *Attorney, Agent, or Firm* — Woodcock Washburn LLP

(57) ABSTRACT

Methods and systems are provided that enable communication with a wireless device. In one such method, a communication event that is intended for a wireless device is detected and a user account associated with the wireless device is identified. Information associated with the user account is identified and a determination is made as to whether the information permits the communication event to occur. If the determination is that the information does not permit the communication event to occur, the communication event is terminated. If the determination is that the information permits the communication event to occur, the communication event is enabled.

21 Claims, 3 Drawing Sheets

200

- 201 — Subscriber Access of Account
- 203 — Add, Change and/or Delete of Restriction
- 205 — Apply Restriction

FIG. 2A

NETWORK-BASED SUBSCRIBER CALLING RESTRICTIONS

CROSS-REFERENCE TO RELATED APPLICATION

This application is a continuation of U.S. patent application Ser. No. 11/489,410, now U.S. Pat. No. 7,711,344, filed Jul. 19, 2006, the content of which is incorporated by reference herein in its entirety.

BACKGROUND

In some applications involving wireless devices such as a cellular telephone, it is desirable to restrict the calls—whether the call is voice or data—that can be placed or received. For example, a Firefly™ cellular telephone is designed to be used by children and has limited functionality for a child to place or receive calls. Typically, a parent adds a number of a party the child is permitted to call to an internal phone book. The phone usually has one or more buttons that allow the child to place a call to the stored number, but does not provide a means for dialing numbers that are not stored in the phone book. In addition, the parent may select an option whereby the phone will reject an incoming call that is not from one of the stored numbers. Thus, the child can be restricted to placing calls to and receiving calls from parties who are "approved" by the parent or emergency services (e.g., 911).

Conventionally, the phone book and call restrictions are stored in and maintained by the hardware in the device. Thus, the restrictions are specific to the device itself. If the device's Subscriber Identity Module (SIM) card, which contains the user account information necessary to activate the device, is removed and placed into another compatible device, the new device will not be restricted to the numbers in the phone book. Thus, technically sophisticated children may be able to bypass their parent's restrictions by placing the SIM card into another device.

A device that has the functionality of the SIM card built-in (i.e., manufactured as part of the hardware of the device and therefore incapable of being removed without causing damage to the device) could address this issue. Unfortunately, manufacturing customized devices that have integrated SIM functionality could be more expensive than manufacturing a device that uses a standard SIM card. It may also be desirable to allow the user to move the SIM card from one device to another for interoperability or upgrade purposes. In addition, manufacturing a SIM card that could itself store the restrictions would most likely be significantly more expensive than using a standard SIM card.

Other situations also may involve restricted calling. For example, a company that issues telephones to its employees for certain tasks may wish to restrict calls to a certain geographic area, work-related parties, emergency services, etc. In addition, the company may wish to limit data transfers—such as text messages, audio or video information, or other types of data—to approved parties.

The Global System for Mobile communication standard (GSM) provides (using a standard called "Fixed Dialing Number" (FDN)) for a device feature that enables restrictions to be placed on outgoing calls. The restrictions may be placed using a "wildcard" setting, such as 404-236-****, where a call may be placed to any number that begins with the 404 area code and 236 prefix. The restrictions, however, are limited to a GSM-compliant device that has a SIM card (or Universal Integrated Circuit Card) that supports FDNs and has the feature turned on. In addition, the restrictions are only for outgoing calls; incoming calls are unaffected.

As noted above, device-based restrictions have significant drawbacks in that a sophisticated user can circumvent the restrictions by removing the SIM card and using another device. A network-based restriction would eliminate this problem by associating the restrictions with a user's account, which will always be effective regardless of which device the user is using. A conventional mechanism for establishing a network-based calling restriction involves international dialing. Typically, a cellular service provider has a default setting that does not allow a cellular telephone to dial international numbers. If a user wishes to make such calls, the user must contact a customer service representative of the cellular service provider and request the change. Because the international calling restriction is network-based it is independent of the device being used. For example, if a user removes the SIM card from his or her phone and inserts it into another phone, the restrictions will still be in place because the network will still access the user's account to check for any calling restrictions. Requiring the user to contact a customer service representative, however, is very inconvenient for most users, especially if the user wishes to create a list of approved numbers for incoming and/or outgoing calls. In such a case, the user would be forced to have a lengthy conversation with the customer service representative to enter all of the approved numbers, and would have to call in again every time the user wished to revise the numbers.

Thus, it can be seen a need exists for a user to have the ability to more easily place restrictions on incoming and/or outgoing calls in a network-based and device-independent manner. The present invention addresses this need.

SUMMARY

In view of the above shortcomings and drawbacks, methods and systems are provided that enable communication with a wireless device. In one such method, a request to initiate a communication event from a first wireless device is detected and a first user account associated with the first wireless device is identified. First information associated with the first user account is accessed, and a determination is made as to whether the first information permits the communication event to occur. If the determination is that the information does not permit the communication event, the request to initiate the communication event is denied. If the determination is that the information permits the communication event, the communication event is permitted to occur.

In another such method, a communication event that is intended for a wireless device is detected and a user account associated with the wireless device is identified. Information associated with the user account is identified and a determination is made as to whether the information permits the communication event to occur. If the determination is that the information does not permit the communication event to occur, the communication event is terminated. If the determination is that the information permits the communication event to occur, the communication event is enabled.

In one such system, a database that stores user account data is provided. A core network component that is in operative communication with the database detects a communication event that is intended to or initiated by a user. The core network component also accesses the user account data and determines whether a communication restriction is associated with the user account. If a restriction is associated with the user account, the core network component determines whether the communication event is permissible according to the user account data.

BRIEF DESCRIPTION OF THE DRAWINGS

The foregoing Summary, as well as the following detailed description, is better understood when read in conjunction with the appended drawings. For the purpose of illustrating various embodiments, there is shown in the drawings example embodiments; however, embodiments are not limited to the specific methods and instrumentalities disclosed. In the drawings:

FIG. 2A is a flowchart illustrating an example method of placing, modifying or deleting a restriction according to an embodiment.

DETAILED DESCRIPTION OF ILLUSTRATIVE EMBODIMENTS

The subject matter of the various embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

For purposes of explanation, embodiments of the invention are described herein in connection with the Global System for Mobile Communication (GSM). The references to GSM are not exclusive, however, as it should be appreciated that embodiments may be implemented in connection with any type of wireless access system such as, for example, CDMA or the like.

GSM is one of the most widely-used wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Figure 1:
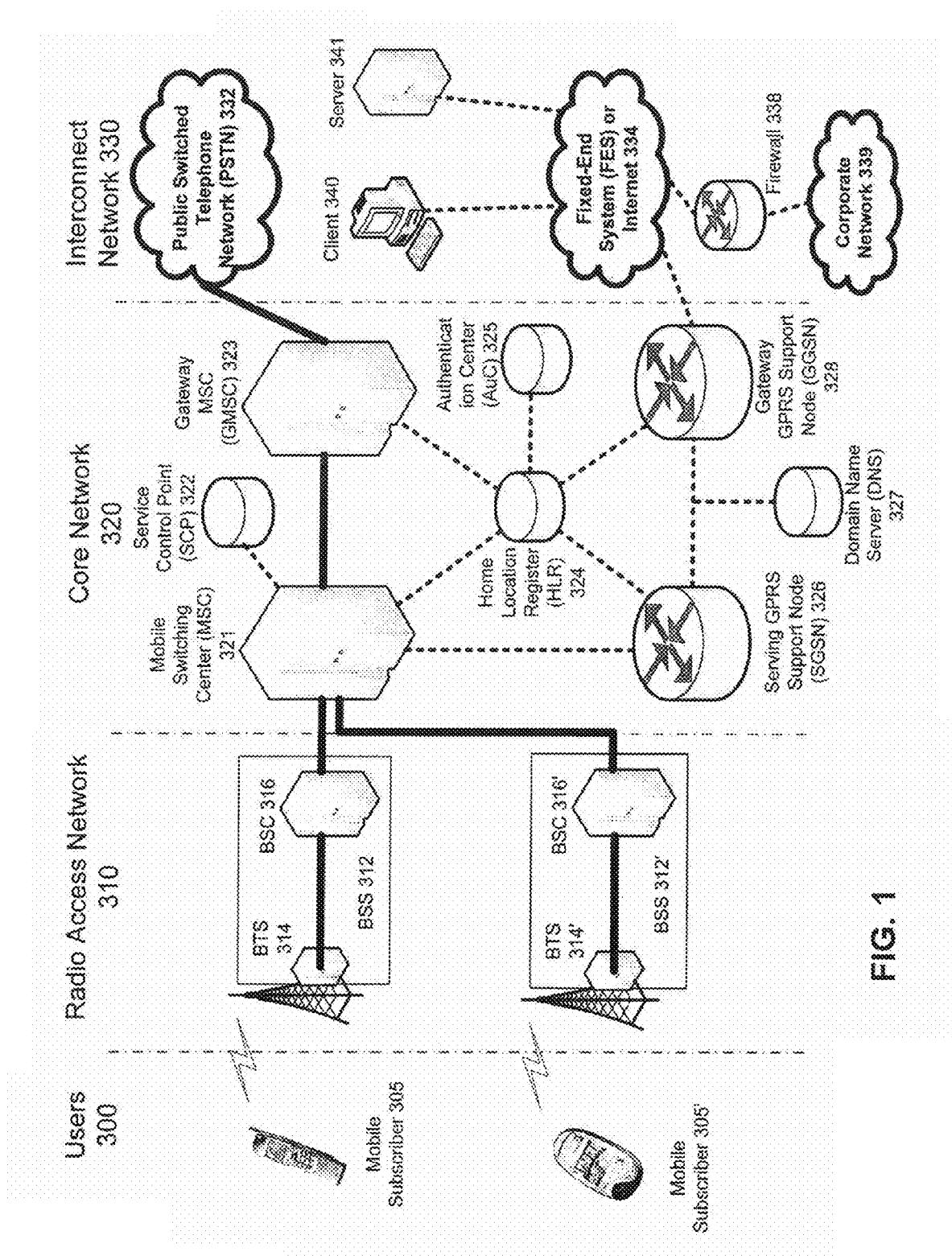
FIG. 1 is a diagram illustrating a high-level overview of a General Packet Radio Service architecture in which aspects of the invention may be implemented.

FIG. 1 illustrates a segmental view of the architecture of a typical GPRS network in that the network is segmented into four groups: users 300, radio access network 310, core network 320, and interconnect network 330. Users 300 may comprise any number of end users; in FIG. 2 only mobile subscribers 305 and 305' are shown. Radio access network 310 comprises a plurality of base station subsystems such as BSS 312 and 312', which include BTS 314 and 314' and BSC 316 and 316', respectively. Core network 320 comprises a host of various network elements, as illustrated in FIG. 2 it comprises Mobile Switching Center ("MSC") 321, Service Control Point ("SCP") 322 and gateway MSC 323, although other components may also be present. Interconnect network 330 comprises a host of various networks and other network elements, as illustrated in FIG. 2 it comprises Public Switched Telephone Network ("PSTN") 332, Fixed-End System ("FES") or Internet 334, firewall 338 and Corporate Network 339.

As will be discussed below, client 340 (which may be any type of computing device such as, for example, a user's PC) may communicate with one or more components of core network 320 by way of Internet 334. Alternately, server 341 may communicate with client 340 on behalf of core network 320 (such as when a third party hosts a web site on behalf of core network 320, for example).

A mobile switching center can be connected to a large number of base station controllers. At MSC 321, depending on the type of traffic, the traffic may be separated in that voice may be sent to Public Switched Telephone Network ("PSTN") 332 through Gateway MSC ("GMSC") 323, and data may be sent to SGSN 326, which then sends the data traffic to GGSN 328 for further forwarding. When MSC 321 receives call traffic, for example, from BSC 316, it sends a query to a database hosted by SCP 322. SCP 322 processes the request and issues a response to MSC 321 so that it may continue call processing as appropriate.

Home Location Register ("HLR") 324 is the central database for all users to register to the GPRS network. It stores static information about the subscribers such as the International Mobile Subscriber Identity ("IMSI"), subscribed services and a key for authenticating the subscriber. HLR 324 also stores dynamic subscriber information such as the current location of the mobile subscriber. Associated with HLR 324 is AuC 325, which may include a database that contains the algorithms for authenticating subscribers and the necessary keys for encryption to safeguard the user input for authentication.

As discussed above, a subscriber may wish to place incoming and/or outgoing call restrictions on the subscriber's account. For ease of explanation, the discussion herein refers to "call" restrictions. It will be appreciated that the use of the word "call" is merely a shorthand reference to any type of communication that may be performed using a wireless device. The wireless device may be in communication with another wireless device, with a wired "POTS" telephone, or any other type of device. A non-limiting list of example "calls" may include, for example: a telephone conversation, text message, video message, "push to talk" message, voice message, picture message, Multimedia Messaging Service (MMS) message, Internet browsing session, instant messaging message, and the like. Thus, when a reference to a "call" is made herein, the reference refers to any type of communication.

Call restrictions may involve, for example, phone numbers of parties who are either expressly permitted to or forbidden from calling or being called by the specified subscriber's account. It will be appreciated that the subscriber may place a restriction on his/her own account, or one or more phone lines associated with a single or multiple accounts, for example. Thus, a parent may place a restriction on a child's phone line, an employer may place a restriction on an employee's phone line, etc.

Phone number-specific restrictions are not the only type of restriction contemplated by an embodiment. Rather, any type of restriction may be used. For example, a geographic restriction may be specified using an area code, an area code plus a prefix, or the like. Alternately, a geographic restriction may involve a specified geographic region in which a call may (or may not) originate (or terminate). Restrictions may also be time-based, and such time-based restrictions may be used in connection with other restrictions, or as a stand-alone restriction. For example, an employee's account may involve a restriction that allows the employee to only make or receive calls during business hours. As a further non-limiting example, a child's restriction may only permit calls to or from approved friends outside of school hours. Thus, it will be appreciated that any type or combination of restrictions are contemplated by an embodiment.

In an embodiment, caller restrictions may be stored in HLR 324 or in any other core network 320 component such as, for example, a Visitor Location Register (now shown in FIG. 1), AuC 325, a component that is accessible to a core network 320 component, or the like. For example, a subscriber may access the caller restrictions by way of a web site or other type of electronic interface. The web site may be hosted by server 341, or a component of core network 320. The subscriber may access the web site using a personal computer, PDA or the like, as represented by client 340. Alternately, or in addition to client 340, the subscriber may access the website/electronic interface using mobile subscriber equipment 305 or 305', by way of radio access network 310, core network 320 and/or interconnect network 330.

The caller restrictions may be stored as one or more additional fields in a subscriber's account information, or may be stored as a separate data entity. Any data format may be used to store caller restrictions, and the format of storage, as well as the mechanisms by which such restrictions are created, stored and accessed may be conventional.

A subscriber may access, for example, a web site to create, modify or delete caller restrictions. In one embodiment, the management of such restrictions may be the sole purpose of the web site. Alternately, the web site may have other purposes, such as, for example, account information (billing, usage, etc.). When a subscriber adds, modifies or deletes a restriction, the change may be reflected immediately, or after a delay, which may be due to network latency, or due to subscriber preference (i.e., the subscriber may specify a date and/or time at which the change is to become effective).

Now that examples of caller restrictions—as well as examples of the mechanisms by which such restrictions may be created, stored and accessed—have been discussed, example non-limiting methods of placing a caller restriction, as well as processing a call is described. Such methods may, in one embodiment, performed by a computer that reads and executes computer-readable instructions that are stored on a computer-readable medium (e.g., RAM, CD-ROM, encoded signal, etc.). In such an embodiment, the computer-readable instructions may direct the computer to perform the steps recited below.

FIG. 2A is a flowchart representing an example method 200 of placing, modifying or deleting a caller restriction according to an embodiment. At step 201, a subscriber accesses his or her account. For example, in an embodiment where a web site is provided to the subscriber, the subscriber may log in to his or her account using a personal computer, PDA, or the like. The log in mechanism may be conventional such as, for example, a user name and password screen. The web site itself may be a subscriber's account web site where the subscriber can perform other account-related functions such as viewing and paying bills, changing services, etc. Alternately, the web site may be specifically for caller restrictions. In another alternate embodiment, a subscriber may be able to access caller restrictions by calling into an audio-based account system. Such a system may use keypad inputs, voice recognition and/or the like. Regardless of the mechanism used to enable a subscriber to access the caller restrictions, any type of authentication or security precautions may be used (such as, for example, the aforementioned user name and password).

The caller restriction placed by the subscriber may be for any wireless device associated with the subscriber. For example, if the subscriber has more than one wireless device (e.g., the subscriber has a family-oriented plan with a wireless device for each family member, a business plan with a wireless device for several employees, or the like), the subscriber may place the restriction for each device individually, globally (i.e., the subscriber may specify that the restriction applies to all wireless devices associated with the account), or according to some other criteria. For example, the subscriber may specify that his or her children's wireless devices will have the caller restrictions, but his or her spouse's device will not. Likewise, a businessperson subscriber may specify that a certain class of employees will have the caller restriction, but that another class (e.g., executives, managers and the like) will not.

At step 203, an update to a subscriber's caller restrictions (i.e., the creation, modification or deletion of one or more caller restrictions, etc.) is saved and associated with the subscriber's account information on a wireless network. As discussed above, the caller restriction may be stored along with other subscriber account information, or may be stored separately. Any type of data storage mechanism may be used in connection with step 203, and such mechanism may be conventional.

At step 205, the caller restriction is applied to a call made to or from a wireless device with which a caller restriction is associated. Various actions that may take place in connection with step 205 is now discussed in connection with method 250 of FIG. 2B.

Figure 2B:
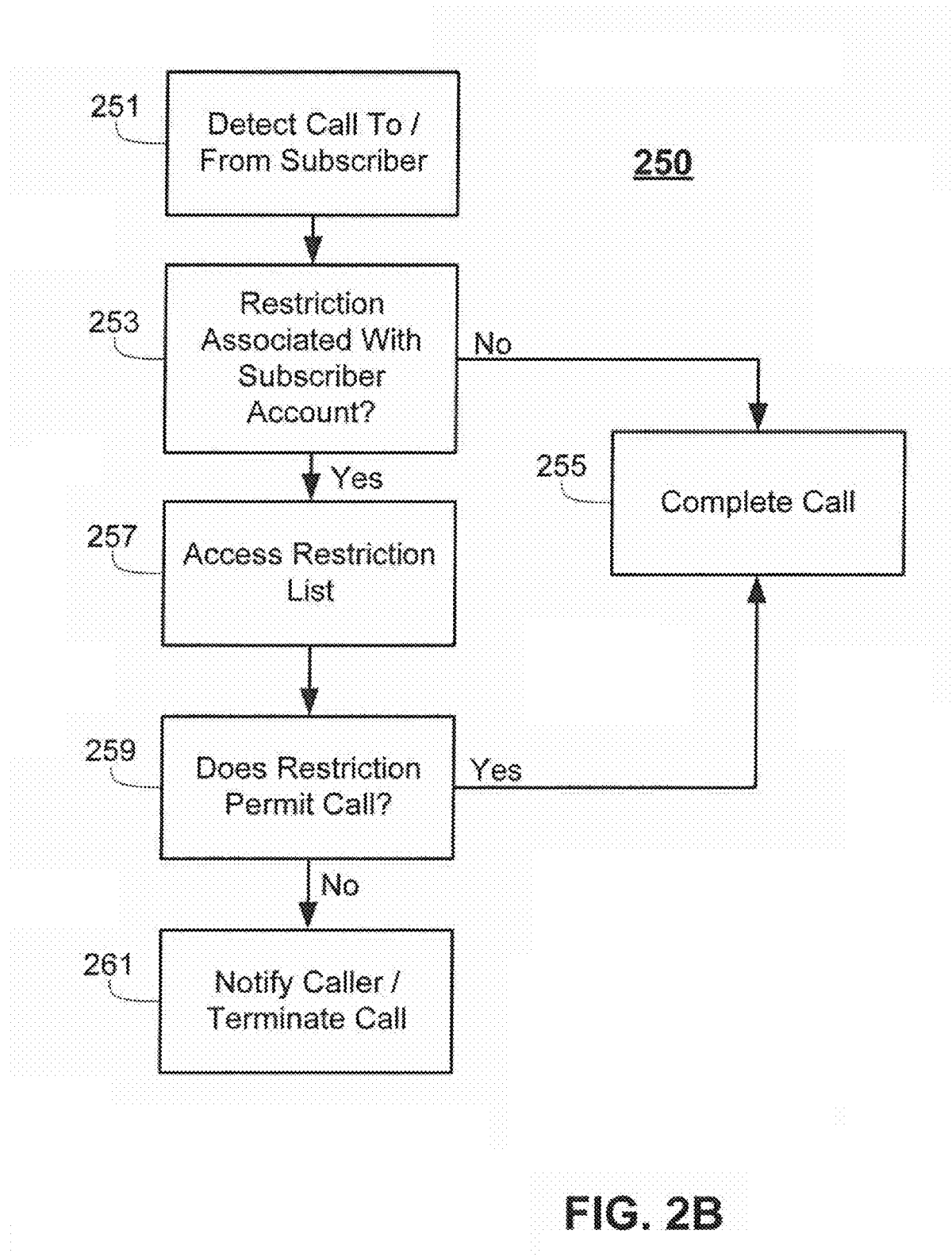
FIG. 2B is a flowchart illustrating an example method of call processing according to an embodiment.

FIG. 2B is a flowchart illustrating an example method of call processing according to an embodiment. It will be appreciated that method 250 may, in one embodiment, take place in connection with step 205 of FIG. 2A. At step 251, a call that is placed (i.e., a request to initiate a communication event) either to or from a subscriber is detected by one or more components of a servicing network. In one embodiment, such a network may be as was discussed above in connection with FIG. 1, although it should be appreciated that any type of wireless communication network may be used in connection with an embodiment.

At step 253, a determination is made by one or more components of the network as to whether a calling restriction is associated with the subscriber's (i.e., the calling and/or the called party) account. For example, in one embodiment, an MSC may access a caller's account information, which may be stored in a HLR, VLR or the like, to determine whether any caller restrictions are present. If the result of the determination of step 253 is that a restriction is not associated with the subscriber's account, then at step 255 the call is approved. It will be appreciated that if the determination of step 253 was with respect to a calling party, an additional determination may need to take place with respect to the called party. Thus, "approval" of the call may either involve the first step of verifying the caller's restriction status, pending the verification of the called party's status, or may involve completing the call (e.g., if both parties' restriction statuses have been checked and the call is permissible, or if one or both parties do not have restrictions, or the like).

If, however, the result of the determination of step 253 is that a restriction is associated with the subscriber's account, then at step 257 the restrictions associated with the account are accessed. At step 259, a determination is made as to whether the restrictions associated with the subscriber's account permit the call connection to be made. As will be appreciated, if method 250 is being performed on behalf of a calling party, the determination of step 259 may be whether the restriction permits the outgoing call to be placed. Likewise, if method 250 is being performed on behalf of a called party, the determination of step 259 may be whether the restriction permits the incoming call to be accepted. If the determination of step 259 is that the call is permitted according to the restriction(s), then at step 255 the call is approved, as was discussed above.

If, however, the determination of step 259 is that the call cannot be completed, then at step 261 the call is terminated (i.e., the request to initiate a communication event is denied). As part of step 261, the calling party may be notified that the call cannot be completed. A reason may or may not be given, depending on any number of factors. For example, a subscriber may or may not want a calling party to know that they have not authorized their calls to be connected. In one embodiment, a called party may be notified that a call has been blocked. In embodiments where the call is a text message, a return text message may be sent explaining that the subscriber is not available or permitted to receive messages, for example.

While the various embodiments have been described in connection with the preferred embodiments of the various figures, it is to be understood that other similar embodiments may be used or modifications and additions may be made to the described embodiment for performing the same function of the various embodiments without deviating therefrom. Therefore, the embodiments should not be limited to any single embodiment, but rather should be construed in breadth and scope in accordance with the appended claims.

What is claimed:

1. A method comprising:
   receiving a modification via an electronic interface to modify a caller restriction for a first user account;
   detecting a request to initiate a communication event from a first wireless device associated with the first user account, wherein the request is directed to a second wireless device;
   determining whether the modification permits the communication event to occur;
   if the determination is that the modification does not permit the communication event, denying the request to initiate the communication event; and
   if the determination is that the modification permits the communication event:
      identifying a second user account associated with the second wireless device;
      accessing information associated with the second user account;
      determining whether the information permits the communication event to occur;
      if the determination is that the information does not permit the communication event to occur, denying the request to initiate the communication event; and
      if the determination is that the information permits the communication event to occur, permitting the communication event to occur and enabling communication between the first wireless device and the second wireless device.

2. The method of claim 1, wherein the communication event is at least one of a telephone conversation, a text message, a video message, a push to talk message, a voice message, a picture message, a Multimedia Messaging Service (MMS) message, an Internet browsing session, and an instant messaging message.

3. The method of claim 1, wherein the first wireless device is at least one of a cellular telephone and a Personal Digital Assistant.

4. The method of claim 1, wherein denying the request to initiate the communication event further comprises sending a message to the first wireless device that the communication event will not occur.

5. The method of claim 1, wherein the modification identifies at least one of at least one second wireless device with which communication is permitted, a time period in which communication is permitted, a telephone area code within which communication is permitted, and a prefix within which communication is permitted.

6. The method of claim 1, wherein the modification identifies at least one of: at least one second wireless device with which communication is not permitted, a time period in which communication is not permitted, a telephone area code within which communication is not permitted, and a prefix within which communication is not permitted.

7. The method of claim 1, wherein the information identifies at least one of the second wireless device, a number associated with the second wireless device, and a location of the second wireless device.

8. The method of claim 1, wherein the electronic interface is a web site.

9. A method comprising:
   receiving a modification to modify first information associated with a subscriber account;
   detecting that a communication event is intended for a wireless device from a calling party, wherein the wireless device is associated with the subscriber account;
   accessing the first information associated with the subscriber account;
   determining whether the modification permits the communication event;
   if the determination is that the modification does not permit the communication event, terminating the communication event; and
   if the determination is that the modification permits the communication event:
      accessing second information associated with the calling party;
      determining whether the second information permits the communication event to occur;
      if the determination is that the second information does not permit the communication event to occur, terminating the communication event; and
      if the determination is that the second information permits the communication event to occur, permitting the communication event to occur.

10. The method of claim 9, wherein the communication event is at least one of a telephone conversation, a text message, a video message, a push to talk message, a voice message, a picture message, a Multimedia Messaging Service (MMS) message, an Internet browsing session, and an instant messaging message.

11. The method of claim 9, wherein the wireless device is at least one of a cellular telephone and a Personal Digital Assistant.

12. The method of claim 9, wherein the first information identifies at least one of a party with which communication is permitted, a telephone area code within which communication is permitted, a prefix within which communication is permitted, a time within which communication is permitted and a location within with communication is permitted.

13. The method of claim 9, wherein the second information identifies at least one of the calling party, a number associated with the calling party, and a location of the calling party.

14. The method of claim 9, further comprising:
providing an electronic interface with which a subscriber may access the subscriber account; and
receiving, via the electronic interface, input from the subscriber that specifies at least one of the modification, the first information, and the second information.

15. The method of claim 14, wherein the user interface is a web site.

16. A system for enabling communication with a wireless device, comprising:
a database that stores subscriber account data associated with at least one wireless device, wherein the at least one wireless device is associated with at least one user of the wireless device; and
a core network component that is in operative communication with the database, wherein the core network component is configured to:
receive a modification to modify the subscriber account data associated with the at least one wireless device;
detect a communication event intended for the at least one wireless device from a calling party;
access the subscriber account data;
determine whether the modification permits the communication event;
if the determination is that the modification does not permit the communication event, terminate the communication event; and
if the determination is that the modification permits the communication event:
access information associated with the calling party;
determine whether the information permits the communication event to occur;
if the determination is that the information does not permit the communication event to occur, terminate the communication event; and
if the determination is that the information permits the communication event to occur, permit the communication event.

17. The system of claim 16, wherein the information identifies at least one of the calling party, a number associated with the calling party, and a location of the calling party.

18. The system of claim 16, wherein the database is stored in at least one of a Home Location Register and a Visitor Location Register.

19. The system of claim 16, wherein the core network component is at least one of a Mobile Switching Center, a Gateway Mobile Switching Center, an Authentication Center, a General Packet Radio Service Support Node, and a Gateway General Packet Radio Service Support Node.

20. The system of claim 16, further comprising an electronic interface that enables a subscriber to modify the subscriber account data, and wherein the electronic interface causes the user account data to be saved in the database.

21. The system of claim 20, wherein the electronic interface is a web site.

* * * * *